(No Model.)
J. RENIKER.
DUST PAN.
No. 521,044. Patented June 5, 1894.
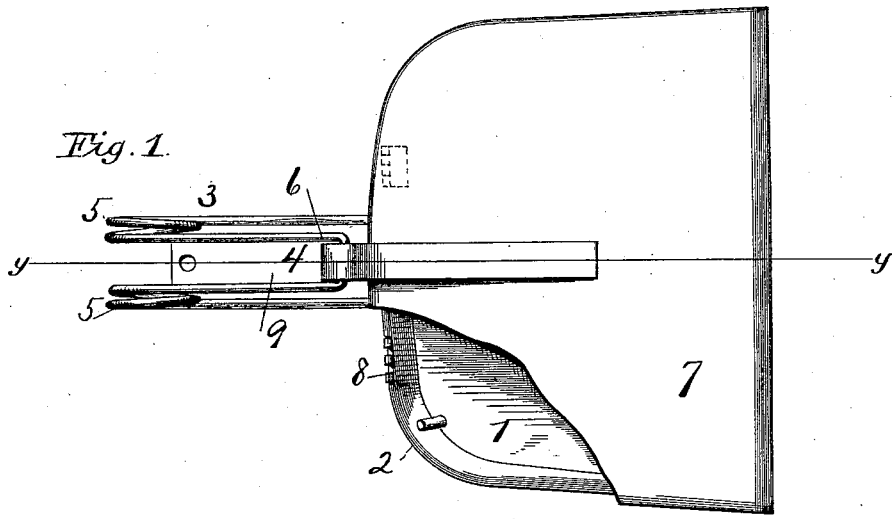
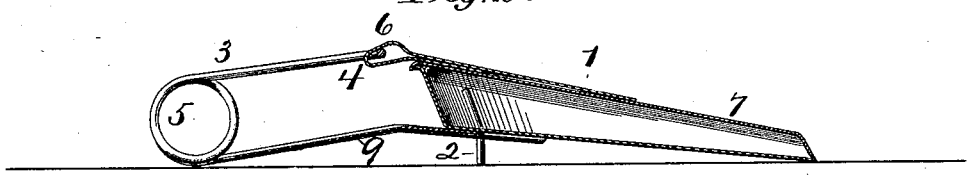
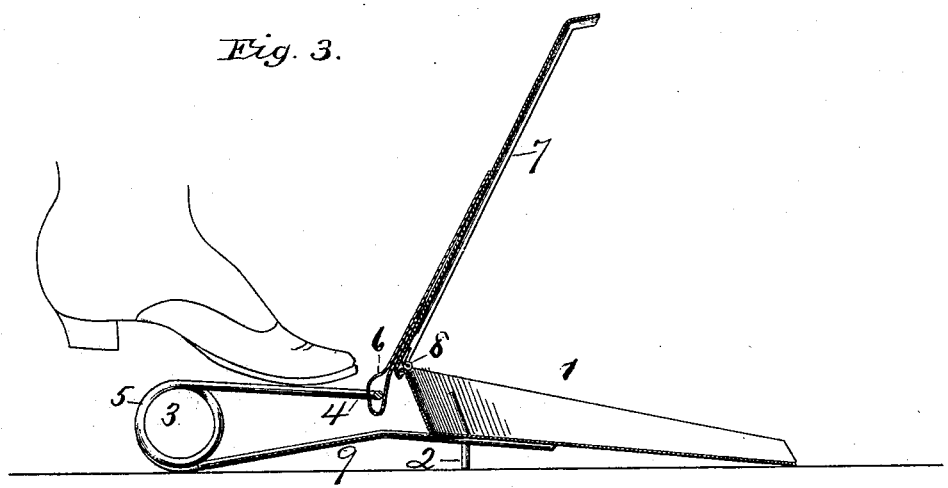
Witnesses:
W. H. H. Knight
Alfred T. Gage
Inventor:
James Reniker
per
W. G. Henderson
Attorney.

UNITED STATES PATENT OFFICE.

JAMES RENIKER, OF DENNISON, OHIO.

DUST-PAN.

SPECIFICATION forming part of Letters Patent No. 521,044, dated June 5, 1894.

Application filed February 7, 1894. Serial No. 499,365. (No model.)

*To all whom it may concern:*

Be it known that I, JAMES RENIKER, a citizen of the United States, residing at Dennison, in the county of Tuscarawas and State of Ohio, have invented certain new and useful Improvements in Dust-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to dust pans, and has for its object to construct the pan with a hinged cover connected with a spring handle which can be actuated either by the foot or by the hand so as to throw open the cover and at other times to hold the cover closed.

The invention consists in the construction and in the combination of parts as hereinafter particularly described and then defined by the claims, reference being had to the accompanying drawings, forming a part hereof, and in which—

Figure 1 is a plan view of the dust pan with my invention applied, a portion of the cover to the pan being broken away. Fig. 2 is a vertical longitudinal section on the line $y-y$ of Fig. 1. Fig. 3 is a similar view showing the cover thrown up by a depression on the spring handle by the foot.

In the drawings the numeral 1 designates the pan which preferably is provided at its rear with prongs or feet 2 which by preference consist of pieces of stiff wire passed through the bottom of the pan, the portion inside the pan lying against the back thereof so as to brace the same while the portions beneath the pan constitute feet or supports for the rear end of the pan, but this feature may be otherwise constructed without departing from other features of this invention. The handle designated by the numeral 3 is composed of wire which is folded to form a loop 4 and then coiled at its rear as shown at 5 so as to constitute a spring and then extended forward toward the pan and having its two free ends secured by solder or otherwise to the bottom or other portion of the pan. The loop of the handle is passed through an eye or loop 6 secured to and extending to the rear of the cover or lid 7 which is attached by a hinge 8 to the rear of the pan 1. The coil 5 of the handle causes the loop of the handle to press upwardly upon the loop or eye 6 of the lid 7 and thus normally holds the lid or cover down in its closed position upon the pan as illustrated in Figs. 1 and 2 of the drawings. By depressing the loop portion of the handle it is caused to bear down upon the loop or eye 6 of the lid and thus to throw up or lift the lid into the position illustrated in Fig. 3 of the drawings, and after the rubbish or sweepings are swept into the pan the release of pressure upon the loop portion of the handle causes the spring to throw down the lid or cover and thus confine the sweepings inside the pan.

By forming the handle and actuating spring of the pan as described, the handle and spring are made practically one and the same so that by grasping the handle with the hand and compressing the handle the lid or cover to the pan is thrown open and by releasing the pressure the lid or cover is closed by the spring. This construction also enables the pan to be more easily manipulated, and furnishes a spring and efficient spring handle not liable to get out of order. It also causes the spring to be more positive in its action upon the lid or cover than it would be if otherwise constructed, and furnishes a spring handle that can be as readily and easily operated by the foot as well as by the hand, and it can be made at a trifling expense or cost.

If desired the two parallel wires of the handle, can be connected together by a web 9 as illustrated in the drawings and clearly in Fig. 1 of the drawings where the two lower parallel members are shown connected by the web. This web will strengthen or brace the parallel wire members so that greater strength and rigidity are imparted thereto. This also enables the handle to be grasped with a stronger grip than otherwise.

Having described my invention and set forth its merits, what I claim is—

1. The dust pan provided with a spring handle formed of wire connected at one end to the pan and at the other end to a hinged lid or cover to the pan and at a point intermediate of said two ends made into a coil to constitute a spring, substantially as and for the purposes described.

2. The pan having a lid or cover hinged thereto and provided with an eye or loop at its rear in combination with a handle formed with a loop passing through the loop or eye of the lid and coiled at its rear to form a spring and connected at its forward end to the pan, substantially as and for the purposes described.

3. The combination with the pan and its hinged cover formed with an eye or loop, of the handle formed of wire passed through the loop of the lip and coiled to form a spring and connected to the pan, and the web connecting two parallel members or wires of the handle, substantially as and for the purposes described.

4. The dust pan provided with the feet or supports composed of wire passed through the bottom of the pan with a portion of the wire lying beneath the bottom and another portion lying above the bottom and against the rear of the pan to brace the same, substantially as and for the purposes described.

In testimony whereof I affix my signature in presence of two witnesses.

JAMES RENIKER.

Witnesses:
B. BALDWIN,
VINA GUYNER.